US010686818B2

(12) United States Patent
Kurupati

(10) Patent No.: US 10,686,818 B2
(45) Date of Patent: *Jun. 16, 2020

(54) METHOD AND APPARATUS TO DETECT NON-HUMAN USERS ON COMPUTER SYSTEMS

(71) Applicant: Akamai Technologies, Inc., Cambridge, MA (US)

(72) Inventor: Sreenath Kurupati, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,341

(22) Filed: Feb. 26, 2018

(65) Prior Publication Data

US 2018/0183825 A1 Jun. 28, 2018

Related U.S. Application Data

(63) Continuation of application No. 14/957,485, filed on Dec. 2, 2015, now Pat. No. 9,906,544.

(60) Provisional application No. 62/086,668, filed on Dec. 2, 2014.

(51) Int. Cl.
*H04L 29/06* (2006.01)

(52) U.S. Cl.
CPC ...... *H04L 63/1425* (2013.01); *H04L 63/1416* (2013.01)

(58) Field of Classification Search
CPC ................ H04L 63/1425; H04L 63/1416
See application file for complete search history.

(56) References Cited

U.S. PATENT DOCUMENTS

| 8,505,071 | B2 * | 8/2013 | Fritz | H04L 63/08 726/2 |
|---|---|---|---|---|
| 2009/0055910 | A1 * | 2/2009 | Lee | G06F 21/46 726/6 |
| 2009/0094687 | A1 * | 4/2009 | Jastrebski | G06F 21/36 726/6 |
| 2012/0254940 | A1 * | 10/2012 | Raper | G06Q 20/4014 726/3 |
| 2013/0198821 | A1 * | 8/2013 | Hitchcock | G06F 21/335 726/6 |
| 2013/0276125 | A1 * | 10/2013 | Bailey | H04L 63/1433 726/25 |
| 2014/0013389 | A1 * | 1/2014 | Han | G06F 21/36 726/3 |

(Continued)

OTHER PUBLICATIONS

Zi Chu et al., "Blog or block: Detecting blog bots through behavioral biometrics", 2012, 14 pages. (Year: 2012).*

Primary Examiner — Yonas A Bayou
(74) Attorney, Agent, or Firm — David H. Judson

(57) ABSTRACT

Methods and systems for malicious non-human user detection on computing devices are described. The method includes collecting, by a processing device, raw data corresponding to a user action, converting, by the processing device, the raw data to features, wherein the features represent characteristics of a human user or a malicious code acting as if it were the human user, and comparing, by the processing device, at least one of the features against a corresponding portion of a characteristic model to differentiate the human user from the malicious code acting as if it were the human user.

17 Claims, 16 Drawing Sheets

(56) References Cited

U.S. PATENT DOCUMENTS

| | | | |
|---|---|---|---|
| 2014/0137192 A1* | 5/2014 | Arroyo-Figueroa | ........................ H04L 63/1483 726/3 |
| 2014/0331283 A1* | 11/2014 | Stein | ....................... G06F 15/16 726/3 |
| 2014/0359730 A1* | 12/2014 | Hang | ...................... G06F 21/36 726/6 |
| 2014/0380418 A1* | 12/2014 | Wang | ...................... H04L 63/08 726/3 |
| 2015/0082460 A1* | 3/2015 | Amiga | .................. H04L 63/145 726/28 |
| 2016/0119304 A1* | 4/2016 | Lelcuk | .................... H04L 63/08 726/3 |

* cited by examiner

METHOD AND APPARATUS TO DETECT NON-HUMAN USERS ON COMPUTER SYSTEMS

RELATED APPLICATIONS

This application claims the benefit of U.S. Provisional Application No. 62/086,668, filed Dec. 2, 2014 and entitled "Method and Apparatus to Detect Non-human Users on Computer Systems," the entirety of which is incorporated herein by reference.

BACKGROUND

Computing devices today include servers, desktops, laptops, and mobile devices such as phones and tablets. In typical usage only authorized users are allowed to use the device. However, due to various security weaknesses, unauthorized human and machine takeover may occur.

To prevent unauthorized users from gaining control or access to a computing device/service, various authentication mechanisms exist. However, due to various security weaknesses as well as human errors, security threats can exist in the system which may not be remedied by conventional systems. One such weakness is the presence of malicious programs/bots masquerading as human users on computer systems including web and mobile applications. To detect these malicious programs, anti-virus/malware detection software (SW) or programs may be employed. These detection programs have various limitations. Furthermore, users who do not employ sufficient anti-virus/malware detection SW may pose larger threats.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
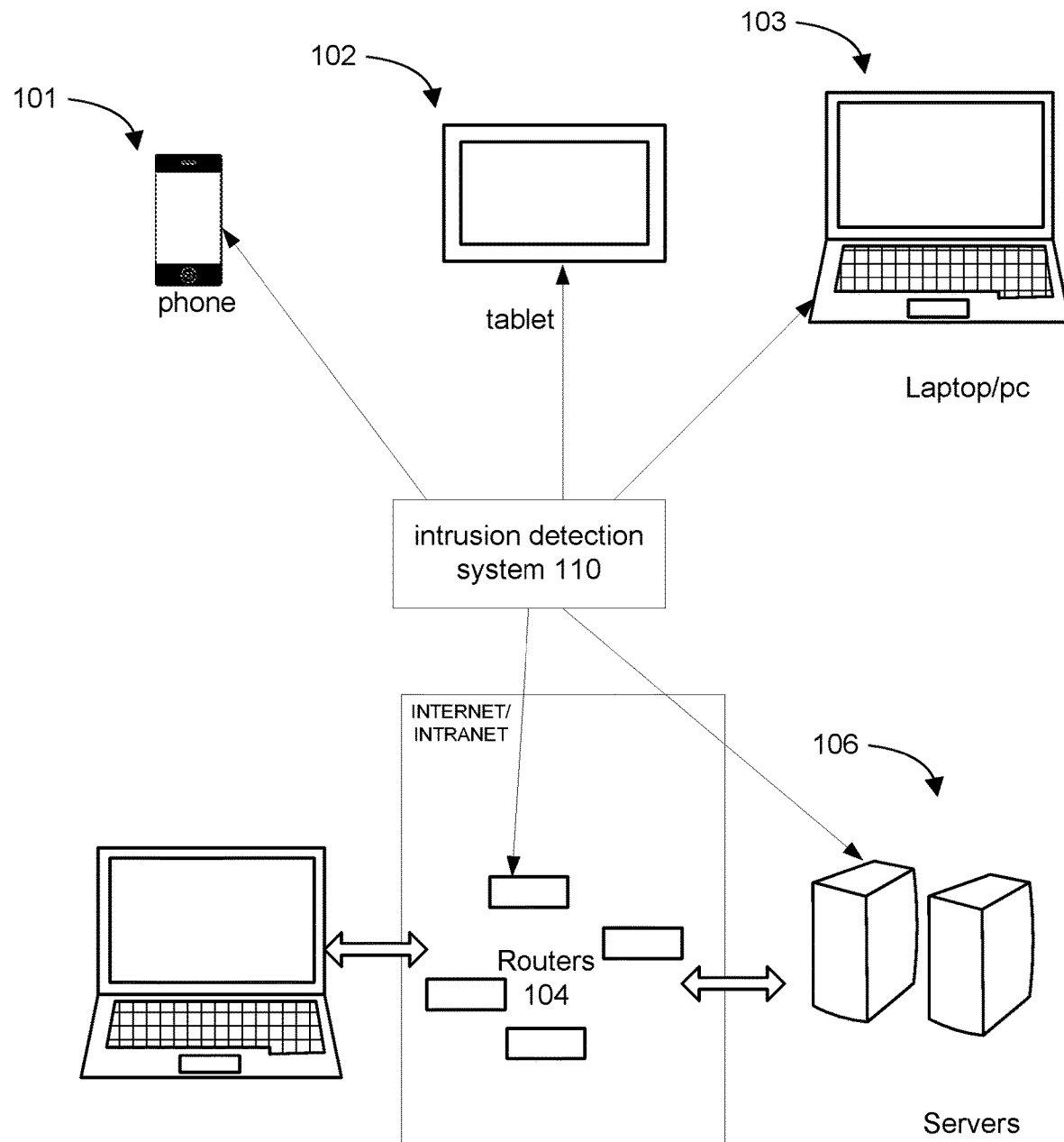
FIG. 1 illustrates embodiments of potential compatible devices.

As described above, to prevent unauthorized users from using a computing device or service, various authentication mechanisms exist today. However due to various security weaknesses, as well as human error, security threats can exist in the system. One such weakness is the presence of malicious programs/bots on computer systems. Typically, to detect these malicious programs, conventional anti-virus/malware detection software products are employed. These conventional detection programs have various limitations. Furthermore, users may not employ the best anti-virus/malware detection software which poses larger threats.

Methods and systems for detection of a malicious non-human user on computing devices are described herein. The embodiments described herein detect malicious non-human users (for example: malicious code, malicious bots, or the like) on computer systems by capturing raw data corresponding with received inputs and using different techniques to compare the data to models created for identifying a user a human user or a malicious non-human user. The embodiments described herein distinguish whether an end user is a human user or a machine masquerading as a human user by manipulation and comparison of collected information.

As used herein, the term "user" may refer to human users or non-human users. These non-human users can be malicious machine programs, malicious scripts, or the like. Unlike anti-virus or malware detection software products that often look for binary signature patterns in malicious code, the present embodiments can analyze the behavior of the user and can distinguish one or more differences in the behavior a human user vs the behavior of a non-human user. Additionally, some embodiments can leverage differences in cognitive capabilities to aid in distinction of the human user vs non-human user. There are several areas where these embodiments may be applied to improve safety. These areas include, but are not limited to, brute force attacks, bot/botnet attacks, man in the middle attacks, and man in the browser attacks, replay attacks, etc. These attacks can occur on both mobile and non-mobile devices. In the following description, numerous details are set forth. It will be apparent, however, to one of ordinary skill in the art having the benefit of this disclosure, that some embodiments may be practiced without some or all of these specific details. In some instances, well-known structures and devices are shown in block diagram form, rather than in detail, in order to avoid obscuring the embodiments of the present invention.

A commonly used method to detect such malicious programs is using an image based CAPTCHA. The idea of a CAPTCHA is that machines are not good at solving some problems that humans can solve (such as image recognition) and by posing a challenge question that involves image recognition, a machine program masquerading as a human will fail the challenge and may be denied access. In some scenarios, there may be some drawbacks to using an image-based CAPTCHA. For example, genuine human users may find using the CAPTCHA to be a nuisance and often incorrectly solve them. This limits the usage of a traditional CAPTCHA only to certain places in an application (like signup pages) leaving the rest of the application/website unprotected. Another possible drawback is that in recent years, it has been demonstrated that computer programs can solve a CAPTCHA. This defeats the main motivation for using a CAPTCHA.

The embodiments described herein detect malicious non-human users (aka malware/malicious code/bots, etc) on computer systems without requiring the use of a CAPT- CHA. Unlike an image based CAPTCHA, the embodiments described herein do not rely on the presentation of a challenge question or image to the user who must provide a response, but rather looks at the detailed nuanced behavior of the user that can be captured and analyzed to determine if the user is human or machine. The behavioral metrics that are analyzed may include mouse activity, keyboard activity, touch activity, gyro, sensor data, or other user interface or detected activity.

Embodiments described herein are directed to technologies for detecting the presence of a non-human actor. However, various embodiments described herein may be applied to distinguish one human user from another human user based on behavioral characteristics of each user.

The embodiments described herein may be implemented in processing logic that may comprise hardware (circuitry, dedicated logic, etc.), software (such as is run on a general purpose computing system or a dedicated machine), firmware (embedded software), or any combination thereof. Embodiments of the invention may be run or executed on various computing devices.

In one embodiment, the processing logic looks at the behavioral data produced when a human user operates computing devices (including mobile devices). For instance, human users perform keyboard/mouse/touch/gyro interaction to provide input to computing devices. There are various behavioral characteristics and features of those behavioral characteristics that can be extracted from this usage (for instance, information extracted may include: duration of key presses, speed, curvature of mouse, touch movements, etc.).

Additionally, there are numerous sensors on mobile devices, such as the accelerometer and gyroscope, which can measure other metrics of some of these behavior characteristics. When humans operate these devices, these numerous sensors produce data that can be used by the processing logic. For instance, the act of a human handling a mobile device produces an accelerometer and/or a gyroscope response. On the other hand, when a computer program/malware/bot is masquerading as a human operator, the behavioral data will be different from human characteristic behavioral data and can be flagged as non-human.

In some cases, an advanced program/bot may use try to work-around the method by doing a human record and replay. For instance, the behavioral data from a real human session may be recorded. A malicious program may use the behavioral data to masquerade as a human user. To detect this scenario, the system may include a database of previous human sessions. Every new session may be compared to the database to check to see if there is a replay match. A replay match may be detected by comparing stored user interaction information with the newly detected interaction information. If characteristics make an exact match or a match within a certain threshold, the user interaction may be determined to be a replay attack. The matching method may further include manners of handling the data or processing techniques to deal with noise and randomness that a malicious program/bot may artificially add to the behavioral data to further attempt to mimic a human user.

Some portions of the detailed description that follow are presented in terms of algorithms and symbolic representations of operations on data bits within a computer memory. These algorithmic descriptions and representations are the manners used by those skilled in the data processing arts to most effectively convey the substance of their work to others skilled in the art. An algorithm is, in this case and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or similar terminology.

It should be borne in mind, however, that all of these and similar terms are to be associated with the appropriate physical quantities and are merely convenient labels applied to these quantities. Unless specifically stated otherwise, as apparent from the following discussion, it is appreciated that, throughout the description, discussions utilizing terms such as "collecting," "converting," "comparing," "receiving," "executing," "defining," "specifying," "creating," "recreating," "processing," "providing," "computing," "calculating," "determining," "displaying," or the like, refer to the actions, operations, and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission, or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 illustrates embodiments of potential compatible devices in which a detection system 110 may be used. Note that there are other computing devices (not shown in FIG. 1) where the embodiments can be applied. The devices include smart phones 101, tablets 102, and laptop/pc's 103. In other embodiments, the detection system 110 may be used in other devices, such as routers 104 and servers 106. The routers 104 may be routers deployed in a network, an intranet, or the Internet. Exemplary network architectures may include multiple client computing systems and multiple server computing systems coupled via a data communications network (e.g., public network such as the Internet or private network such as a local area network (LAN)). The network may include the Internet and network connections to the Internet. Alternatively, the detection system 110 may be located on any device in a common LAN, Personal area network (PAN), Campus Area Network (CAN), Metropolitan area network (MAN), Wide area network (WAN), wireless local area network, cellular network, virtual local area network, or the like. The detection system 110 can be implemented in a client device (also referred to simply as "client"). The client may be a client workstation, a server, a computer, a portable electronic device, an entertainment system configured to communicate over a network, such as a set-top box, a digital receiver, a digital television, a mobile phone or other electronic devices. For example, portable electronic devices may include, but are not limited to, cellular phones, portable gaming systems, portable computing devices or the like. The client may have access to the Internet via a firewall, a router or other packet switching devices. The detection system 110 can be implemented in a server computing system, or in both a client computing system and a server computing system. The detection system 110 may include a portion integrated, for example, into a webpage or a mobile app. One example of integration into a webpage includes JavaScript or some other coding language integrated into a client webpage. In the case of a mobile application, the detection system 110 may include a software development kit (SDK) or other devkit incorporated into the mobile application.

The server computing system may be a network appliance, a gateway, a personal computer, a desktop computer, a workstation, etc. Alternatively, the functionality of the detection system 110 can be distributed over two or more machines. Other embodiments are possible as would be appreciated by one of ordinary skill in the art having the benefit of this disclosure. Some embodiments may include fewer or more connections to facilitate less or more functionality.

Figure 2A:
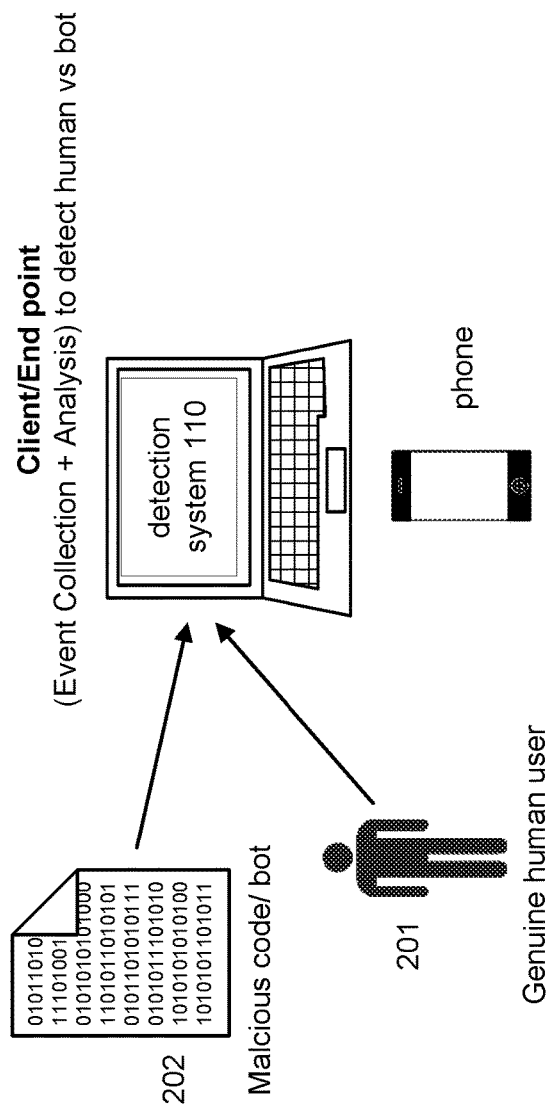
FIG. 2A illustrates one embodiment of a Client/End Point architecture.

FIG. 2A illustrates one embodiment of a Client/End Point architecture. The client device can include any of the embodiments depicted in FIG. 1, including mobile devices. The computing system may be running an application program. The application program typically may include client side code running on the client side. A genuine human user 201 typically uses a computing system. Instead of a genuine human user 201, the computing system may become compromised or infected by malicious code 202 that acts as a user (referred to herein as a "malicious non-human user"). The malicious code 202 may be a malicious computer program (malware, script, bot, etc.). As referred to herein, the term "bot" is used to denote the malicious program/code/actor. The term "bot" can also include malware, automated programs, scripts, etc. In the embodiment depicted in FIG. 2A, the application may run completely on the client/end point device. This includes raw behavioral event collection and analysis of the events to determine whether the device is being operated by a human or by a bot.

Figure 2B:
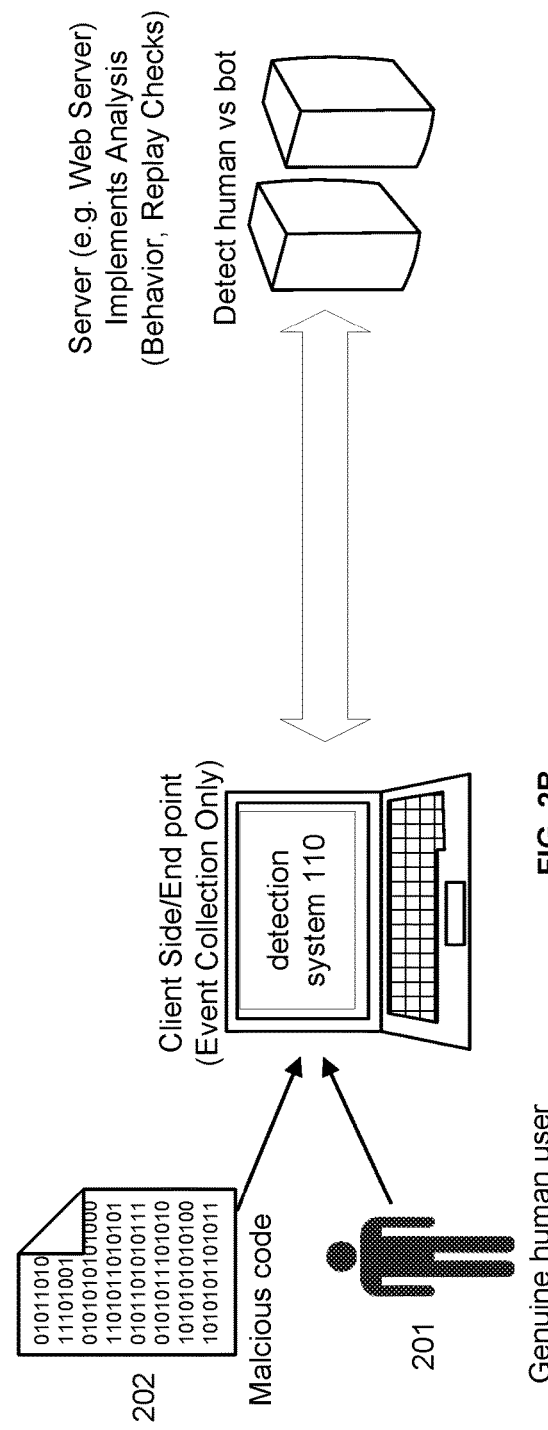
FIG. 2B illustrates one embodiment of a Client Server architecture.

Other embodiments contemplate situations where the malicious program is in a browser executing on the client device, as an intermediate point between the genuine user and the computer system (often termed as man in the middle or man in the browser). In the case of man in the middle/man in the browser situations, the malicious program may insert itself between the user and the access point to use the user's access or information to modify the data maliciously at appropriate intercept points. The computing system itself may be a single system (as illustrated in FIG. 2A) or may be split into a client side device and a server side device (as illustrated in FIG. 2B). Alternatively, other configurations and intercept scheme preventions may be possible.

FIG. 2B illustrates one embodiment of a client server architecture. Unlike FIG. 2A, the components of some embodiments may be split across the client and server. For example, the client/end point device only performs raw behavioral event collection while analysis of the events is done on the server. To facilitate this, information pertaining to the events is sent to the server. It should be noted that the client/server device combinations can include any of the embodiments depicted in FIG. 1, including mobile devices. The computing system may be running an application program. The application program typically may include client side code running on the client side device and server side code running on the server side device. Instead of a genuine human user 201, the computing system may become compromised or infected by malicious code 202 which is attempting to emulate a user (referred to herein as a "malicious non-human user"). Embodiments of the detection system 110 (client-side code and/or server-side code) are aimed at detecting the malicious code 202. Other embodiments include an instance where the malicious program is in a browser executing on the client device, as an intermediate point between the genuine user and the computer system (often termed as man in the middle or man in the browser). In the case of man in the middle/man in the browser situations, the malicious program may use the user's access to modify the data maliciously at appropriate intercept points.

Figure 2C:
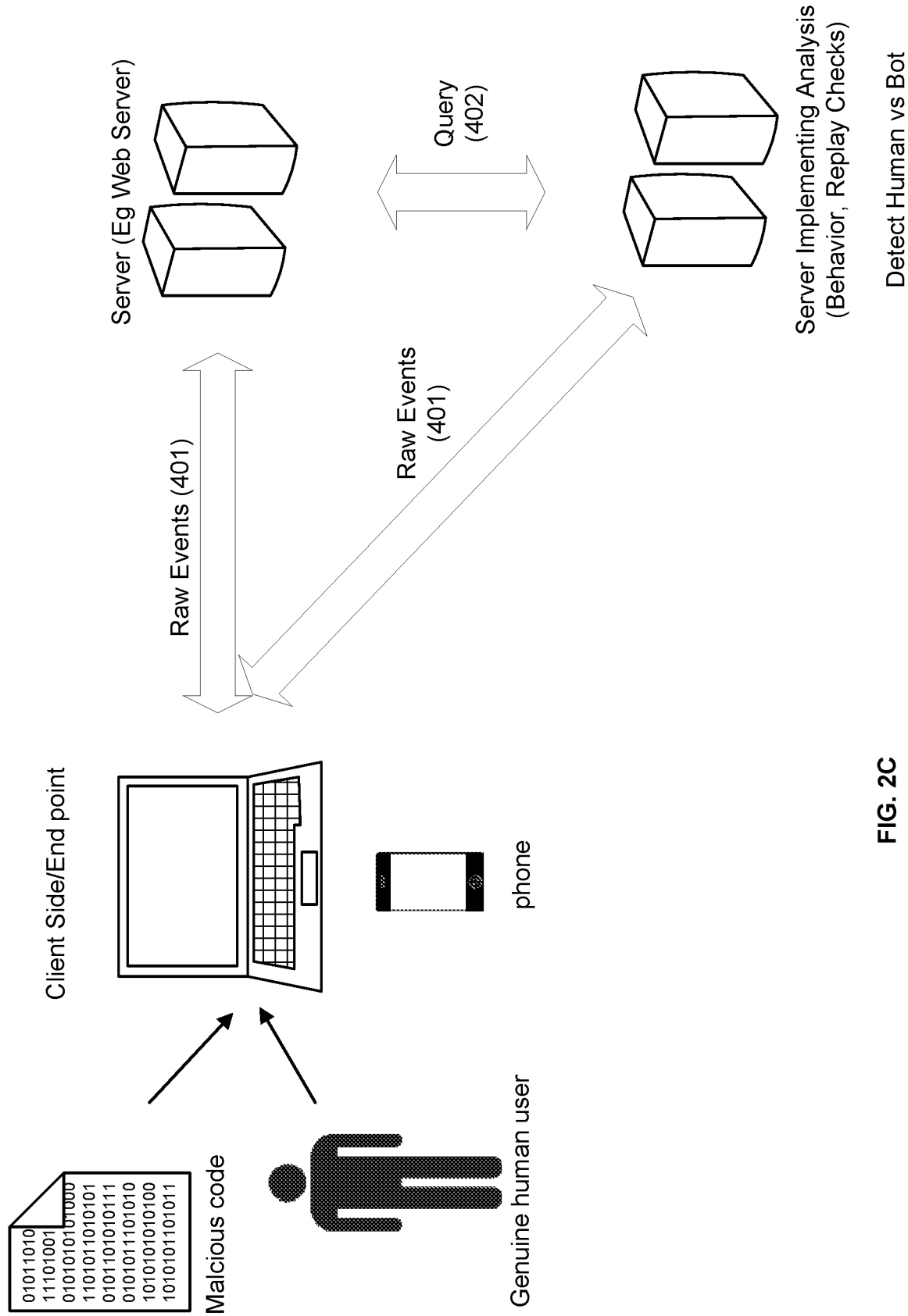
FIG. 2C illustrates one embodiment of a Client, Distributed Server/Cloud architecture.

FIG. 2C illustrates one embodiment of a client, distributed server/cloud architecture. Similar to the embodiment depicted in FIG. 2B, the client/end point may perform raw event collection. Unlike the embodiment in FIG. 2B, two or more servers may be incorporated. The first server may be a webserver that passes on the raw events (401) as a query 402 to an analysis server (shown as a "Server Implementing Analysis"). The query may be an application programming interface (API) call. One example may include a representational state transfer (REST) API call. Other forms or formats may also be used.

The first server may also be a mobile application server, merchant server, or other structure. The analysis server returns a score or other indicator or quantity relaying whether the user is a human or a bot back to the web server. In one embodiment, the raw events (401) are sent directly to the analysis server. With direct transmission, the web server may not need to include the raw events in its query, but can simply request the analysis score or output. In other embodiments, other possible embodiments are also feasible where the detection system is split across multiple client-server configurations. For example, in one embodiment, the server implementing the analysis may share some or all of the analysis functionality to the web server. Additionally, the server implementing the analysis may share some or all of the analysis to the client side/end point. For example, one or both of the client side/end point or the web server may perform a quick preliminary check for exact match against stored behavioral data. The behavioral data may be stored locally or remotely. This can be advantageous to provide essentially instantaneous checks. Additionally, with the analysis servers arranged out-of-line with regards to communications between the client side/end point and the web server, a failure, crash, or other error or issue on the web server will not interrupt communications between the client and the web server. This arrangement allows the service to the client to continue uninterrupted.

Figure 2D:
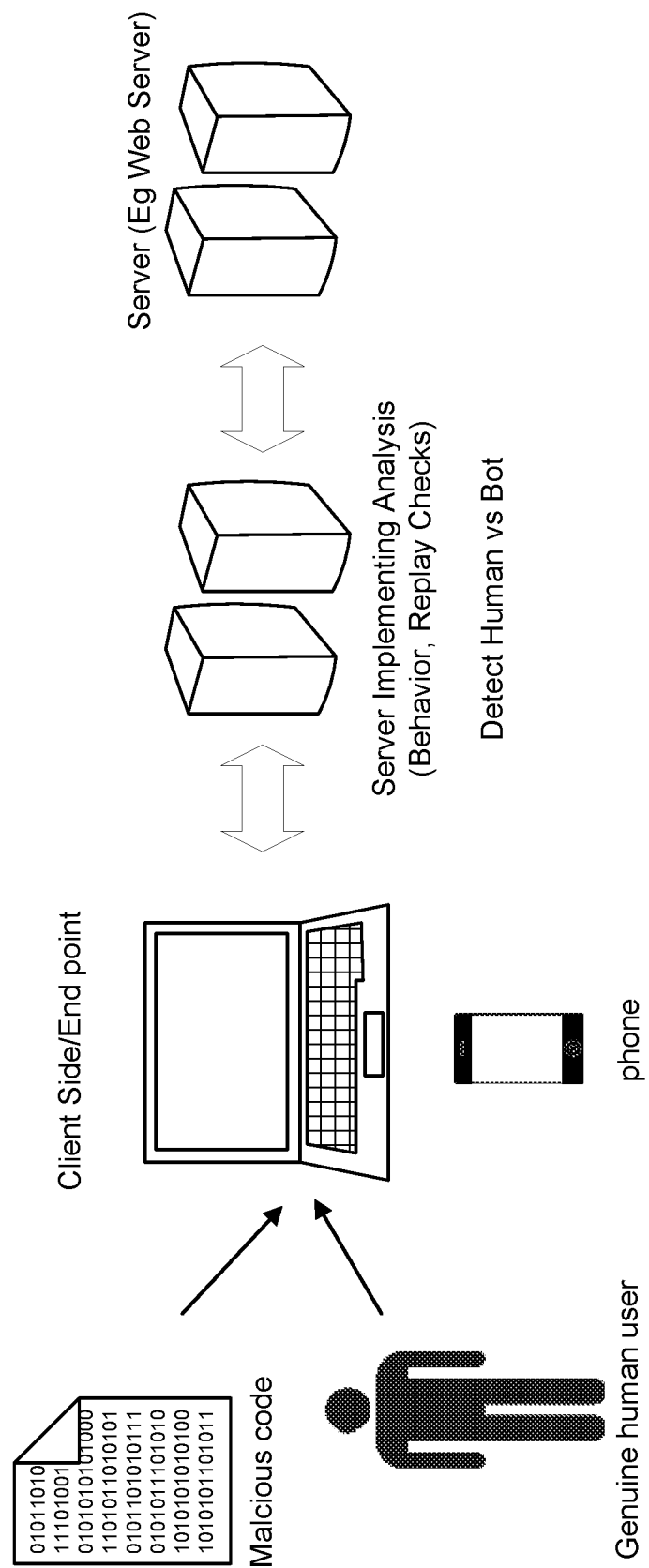
FIG. 2D illustrates another embodiment of a Client, Distributed Server/Cloud architecture.

FIG. 2D illustrates another embodiment of a client, distributed server/cloud architecture. In the depicted embodiment, analysis servers may be located in-line between the client side and the web server. This arrangement may allow for improved security in that an error or fault at the analysis server would prevent any un-analyzed communication to continue to flow between the client side and the web server. Other systems may incorporate other arrangements to achieve other functionality or advantages.

Figure 3:
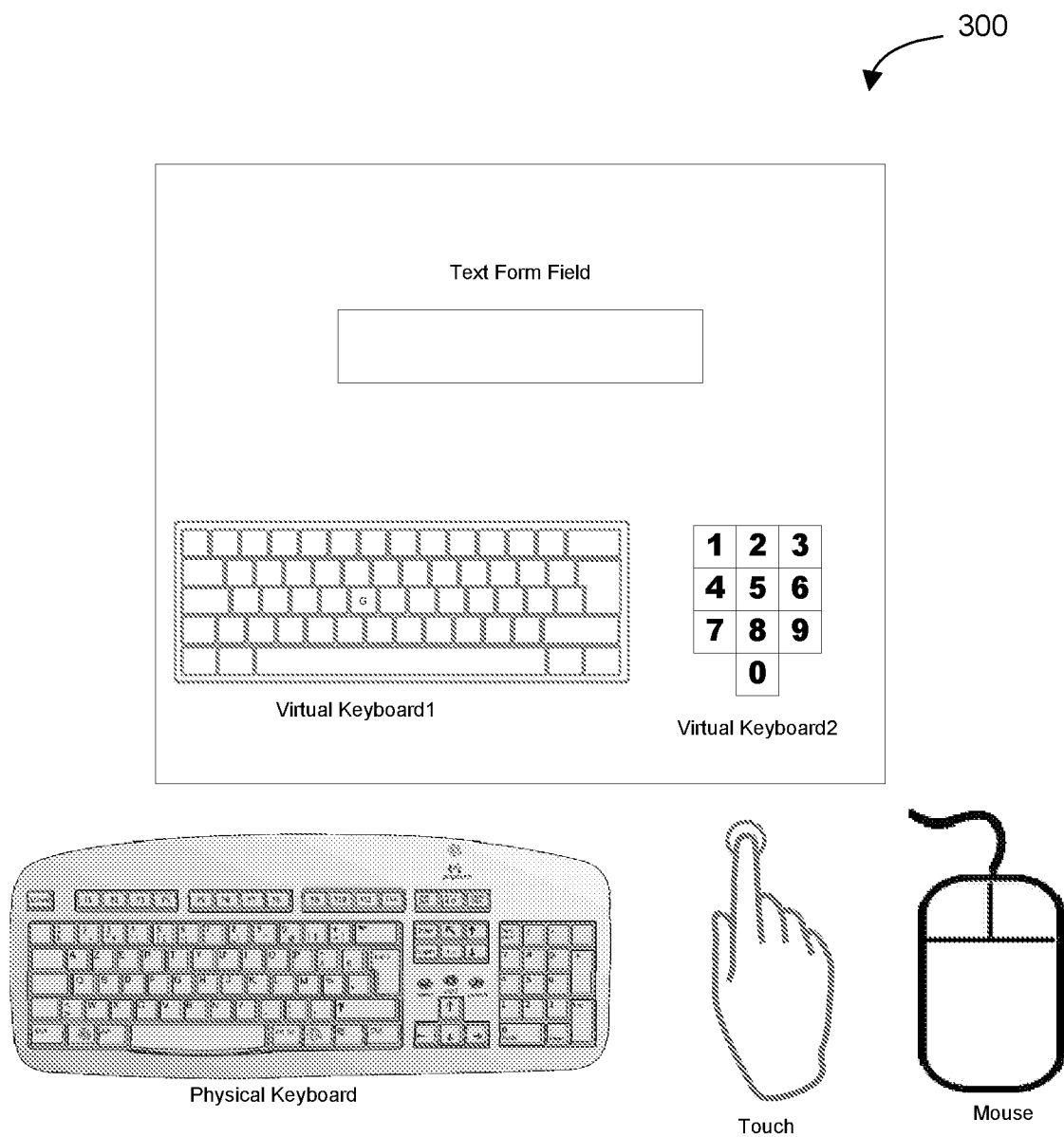
FIG. 3 shows embodiments of various user interface devices from which various behavioral events may be collected.

FIG. 3 illustrates various user interface elements 300 as a user is filling a form in a computer application according to one embodiment. These may include a physical keyboard or virtual keyboards. In case of virtual keyboards, various options are possible. FIG. 3 illustrates two examples where a virtual keyboard can be operated typically by touch or mouse events. Each of these devices produces events that can be used to characterize behavior.

Figure 4:
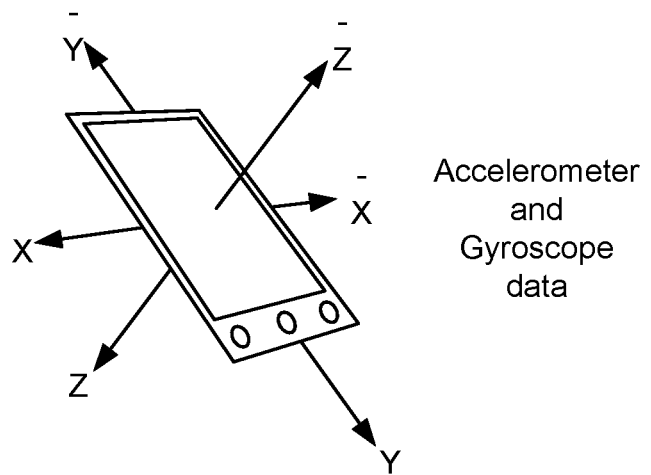
FIG. 4 shows one embodiment of a mobile device from which various sensor events may be collected.

FIG. 4 shows one embodiment of a mobile device from which various sensor events may be collected. These sensor events may include gyroscope and accelerometer events. Other events such as ambient light, temperature, pressure, humidity, location, and other events may be collected.

Figure 5:
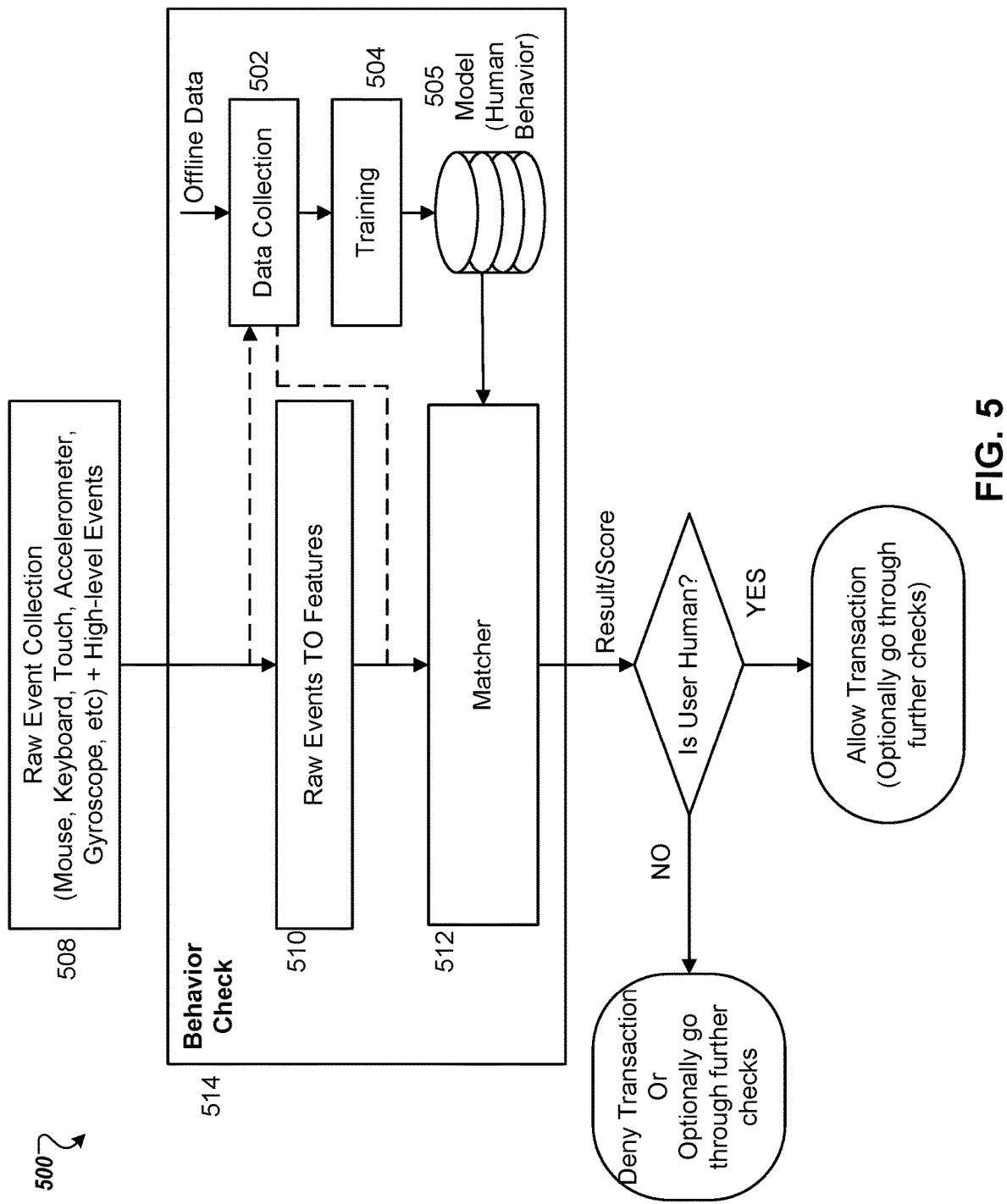
FIG. 5 shows one embodiment of a flow chart for a behavior check.

FIG. 5 shows one embodiment of a flow chart for a behavior check method 500. The method 500 is performed by processing logic that may comprise hardware (circuitry, dedicated logic, etc.), software (such as is run on a general purpose computing system or a dedicated machine), firmware (embedded software), or any combination thereof. In one embodiment, the detection system 110 of FIG. 1, 2A, 2B, or 2C performs the method 500. Alternatively, other components of a client computing system, server computing system, router, or other network device can perform some or all of the operations of method 500.

Referring to FIG. 5, processing logic performs data collection (block 508). Data collection (508) (also referred to as Raw Event collection stage 508) is done to collect various raw events data such as keyboard, mouse, touch, accelerometer, gyroscope, events. Raw keyboard events may include a timestamp of key down/press, timestamp of key up/release, character codes, presence of special flags, combination keys (such as CAPS, CNTRL, etc.). Raw mouse events may include a pixel coordinate of the mouse event, the mouse event type such as mouse move, mouse click, double click, which button got clicked, timestamp of the event, etc. Raw touch events may include a pixel coordinate of the touch event, the touch event type such as touch press, release, move, multi-touch, etc. and the timestamp of the event. Raw accelerometer events may include acceleration along the ±X, Y and Z axes. Raw gyroscope events include device orientation data. In general, event collection 508 may include various possible forms of sensor data. Apart from sensor data, event collection 508 also collects high-level behavioral events. For instance time spent on a web page, application, sequence of operations performed, etc.

The detection system depicted can operate continuously. The Raw Event collection at block 508 serves multiple purposes. The raw event collection can be used as a learning vehicle to build/train a model on human behavioral characteristics. Also, the new incoming events can be analyzed against the learned/trained model to check if the new events are human or bot generated.

For the behavior check stage 514, the raw events (collected at 508) are converted into features/characteristics by the Raw Events to Features Stage 510. In some embodiments, the features can be viewed as abstracted/mathematically processed characteristics of the raw events. These features are used and processed further to determine if the events were generated by human activity or bot activity. Keystroke features may include keystroke dwell/press times and inter keystroke delays. Touch features may include touch duration, touch pressure, touch direction, touch coordinates and timestamps. Touch features may include a motion action such as a swipe, drag, etc. The touch features may include overall characteristics of the action such as line segment/curve effectively rendered by the touch and attributes of the action such as speed, acceleration, and distance characteristics of that curve. Mouse features may include overall characteristics of the line segment/curve effectively rendered by the mouse during the mouse movement and the speed, acceleration, distance characteristics of that curve. Similarly various features can be extracted from the accelerometer, gyroscope and other sensor data events.

The features are then matched against a learned model 505 to determine whether the activity represents human or bot activity. The term "matching" can also refer to a probability analysis of the data (in other words the probability that the activity is human). Various embodiments of the matching/probability analysis technique include nearest neighbor, Manhattan distance, Euclidean distance, Neural Networks, Fuzzy Logic, K-means, SVM or other statistical/pattern matching/machine learning techniques. If the raw events are being generated by bot activity the accompanying features will typically not match the expected model. As an example, mouse curves produced by bots may show up as geometrically perfect lines such as a straight line or perfect curve as opposed to the non-linear curvature produced by human mouse activity. As another example, Bot keyboard activity may appear really fast which shows up as very small inter key press time. As another example, when a bot is entering machine data, the mouse, keyboard, touch, accelerometer, gyroscope, events may be fully absent. Apart from matching against each sensor activity individually against the model, matcher 512 also checks against the fusion of events. For instance, touching or interfacing with a mobile device should trigger a corresponding response in gyroscope and accelerometer sensor events. Additionally, sequences of actions peripheral to the actual user input may be checked against the model. For instance, a given web/mobile flow may require a sequence of mouse and keyboard events to navigate to a certain location. The comparison against the model is therefore done both at the event level as well as the sequence across events for added robustness. The matcher also performs data and behavioral consistency checks. Meaning if the data submitted by the user is indicative of activity "x", but the behavioral data shows activity "y" then the matcher flags this as is indicative of a bot. For example, to enter data into a form or form field, a website may require certain mouse clicks/keyboard events to occur. If the data submitted showed the absence of those events, it shows an inconsistency and can be flagged as potential bot activity. As an example, if the data entered in a form has a character length of 4, but the behavioral data shows only 3 key presses, this illustrates an inconsistency and can be flagged as bot activity.

The following description relates to generation of the characteristic or behavior model. First, data is collected. Note that data collection may be a real time or offline process and may not be linked temporally with the dataflow on the left side of FIG. 5. In some embodiments, initial rules and templates may be provided. In some embodiments, a training period may allow the system to collect sufficient data to generate a model. In other embodiments, the system may run checks and build models from the outset. The collected data may include raw events and features of various activity sessions. Typically (but not mandatorily), supervised learning can be employed where the data is labeled as human or bot and this is used to train the model. The training is done by training stage 504. Various embodiments of the training techniques include (but are not limited to) nearest neighbor, Manhattan distance, Euclidean distance, Neural Networks, Fuzzy Logic, K-means, SVM or other machine learning/statistical techniques. Different behavioral characteristics may employ training techniques suitable for that particular characteristic.

Apart from training on individual characteristics (e.g., keyboard, mouse characteristics), the training is also done for a combination of events for that particular application. For instance if an application/website were to require a particular sequence/combination of keyboard and mouse activity, this is also learned. The learnt model is stored in Model 505.

After the matcher 512 has computed a score/probability analysis of whether the user/activity is human or bot, additional optional checks can be performed. For instance an image CAPTCHA may be employed to cross check the result. Typically if the transaction is deemed to be human it is allowed, otherwise it is blocked.

In one possible embodiment the results are not acted upon immediately but instead stored in a dashboard for offline analysis.

Figure 6A:
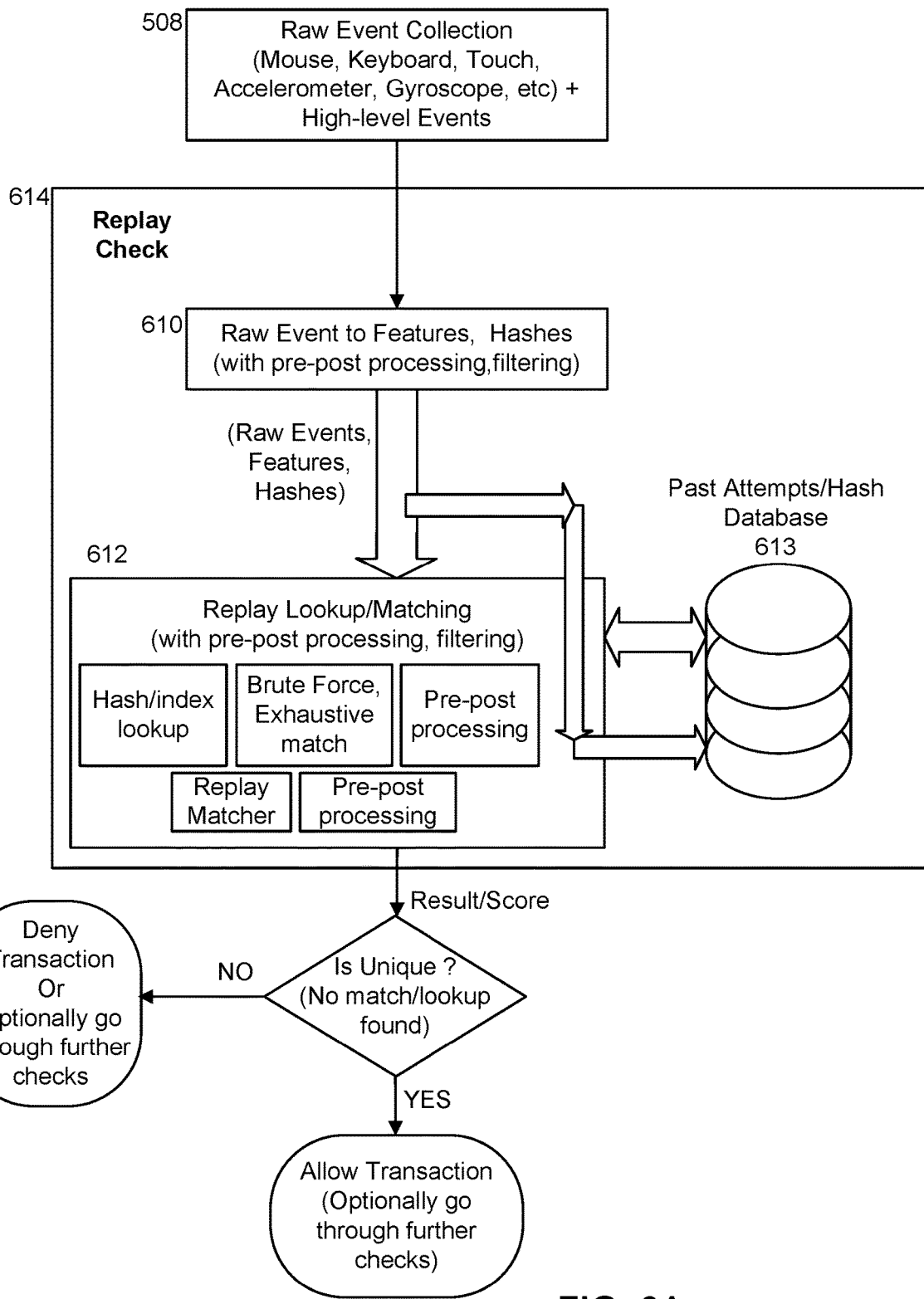
FIGS. 6A-D show embodiments of flow charts for replay checks.

FIGS. 6A-D show embodiments of flow charts for replay checks. FIG. 6A shows one embodiment of a flow chart for a replay check. The illustrated embodiment is capable of detecting and deterring an advanced replay attack. A replay attack includes a case where a bot records a human session and plays back the behavioral data to masquerade as human. In relatively simple record and replay attacks, the bot may only record certain information and not the full behavioral information. In such a case, the embodiment described in FIG. 5 will detect a bot as it will not provide a full input of human behavioral features. One particularly advanced attack on the other hand may record the intricate behavioral information exhibited by a human user and play it back in an attack.

The embodiment illustrated in FIG. 6A depicts the functional flow for one possible embodiment that can detect various kinds of advanced replay attacks (those which include recorded behavioral information). The embodiment in FIG. 6A can detect an attack where a full human session is recorded and replayed (only the non-behavioral transaction data being submitted is optionally changed by the attacker). The embodiment in FIG. 6A can also detect an attack whether some noise/perturbation/randomization has been added to a human recorded session and replayed in an attempt to simulate an original user input. The embodiment in FIG. 6A can also detect an attack where segments of multiple human sessions are recorded and stitched together for playback. The embodiment in FIG. 6A can also detect an attack where segments of a multiple human sessions are recorded, injected with some noise/perturbation/randomization, and stitched together for playback.

The embodiments described herein exploit the fact that it is highly unlikely that a human would be able to exactly replay his behavioral data. For instance, it is nearly impossible for a human being to move his mouse exactly the same way twice because even similar movements may not have the same exact speed, curvature, or pixel hits to reproduce duplicate behavioral data for the mouse movement. The embodiment in FIG. 6A stores previous sessions of behavioral data in a database. Upon detection of an incoming session, the incoming sessions are matched against the stored previous sessions to check if there was a replay. In some embodiments, the behavioral data for previous sessions may be stored for a specific amount of time. In other embodiments, the behavioral data for previous sessions may be stored indefinitely. Other embodiments may allow a user to specify when to remove previous behavioral data. The removal may be automatic or manual. The user may set the time frame for the persistence of the data to, for example, a number of days, weeks, months, or years. The time to keep the data may also be based on an amount of behavioral data stored. New human sessions will not match the stored sessions, whereas a bot replaying human activity will match a stored entry. In some embodiments, the matching is done by comparing data from each session in an index which allows direct comparison of corresponding portions of the stored session and the new session.

The embodiment in FIG. 6A includes stage 508 (that was described in FIG. 5) for raw event collection. Data from stage 508 is processed by stage 610, which may identify features from the data and may further process the data. For example, at stage 610, the data may be processed to create hashes representative of the data. Feature creation is similar to the process described in stage 510 of FIG. 5. Hashes are created to optionally speedup the lookup and matching process described herein. Various schemes can be used to create hashes. This can include simple schemes like adding up the raw event data to create a hash, using some modular arithmetic on the event data, sampling data within a feature, or more complex schemes such as cryptographic hashing schemes. Several hashes are created by stage 610. These include hashes on the full event data and hashes on chunks of data (to handle situations where an attacker is stitching together events from different recorded sessions). Additionally, to deal with noise/perturbation/randomization, the raw event data can be filtered to reduce/remove noise and hashes (both full event data hashes and chunked hashes) can be created on the filtered data. The created features and hashes are appended to the raw events data and sent to the replay lookup/matching stage 612.

Various operations may be employed by stage 612 to check if the incoming behavioral data is a replay of a prior human session. Stage 612 queries past attempts/hash database 613. The database 613 stores full, partial, and hashed behavioral values, features, and other data for past human sessions/transactions. The database 613 is optionally indexed to speed lookup time and multiple column indexes can exist to allow for different fast-lookup techniques. The indexes may be formatted to correspond to the hashes or processing outputs to speed lookup using the hashes or other data processing operations.

The matcher stage 612 can employ various techniques/embodiments to check for a match. Several techniques are described below, but in general other search/pattern matching techniques may be applied. The matcher 612 may employ simple exhaustive/brute force matching where the incoming behavioral raw events are matched with each row in the database 613 to check for a matching row. To determine a match, a distance function can be used to see how close the current entry is with an entry in the database. Various possible distance functions can be used, such as using an L1 norm (Sum of absolute differences or Manhattan distance), L2 norm (Mean square error or Euclidian distance), or other nearest neighbor or statistical distance functions. The calculated distance can be compared with a threshold to indicate a match. In general, a low distance value is indicative of a replay match. To handle noise/perturbation/randomization by a bot/attacker, the incoming data can be filtered to reduce noise. Various techniques are possible, including low pass filtering, nonlinear filtering, etc. The filtering can be done globally or surgically (to remove specific outliers).

To deal with situations where a bot may have stitched recordings from different sessions, the matching may be applied on chunks of the event data/database entry (as opposed to the full event data/database row). Additional filtering to deal with noise can be applied as well.

To optionally speed up the matching process, the hash values computed earlier can be used. Hashing is a time saving mechanism which may be used to eliminate or reduce the need to search through all the rows in the database by focusing on rows where a match is likely. As an example, assume the incoming event data is string of 10 integers (d0, d1 . . . d9). If the database contains 1 million past sessions, operating on 1 million rows each with 10 integers per rows would present a heavy computational challenge. The exhaustive/brute force matching scheme requires matching the vector (d0,d1 . . . d9) with all 1 million vectors/rows.

However, if hashing is used, the speed can go up. For instance, in the database, an index column may be created. An example hash for that index column may use the sum of each row (a single integer). If input data (d0, d1, . . . d9) is received, sum all 10 values (call it sum_d). A look-up in the database may target and fetch rows where sum_d matches the sum of the database row (search time is reduced quite a bit). Once the row has been fetched, the tedious element by element (d0,d1 . . . etc) comparison can be completed. This is a simplistic example to illustrate the purpose of hashing. Other embodiments may include other approaches or techniques.

One, some, or all of the hash values computed in stage 610 can be used to lookup candidate rows in database 613. Use of the hash values may reduce the search space from an exhaustive/brute force match to a smaller subset of rows. For each candidate row, a distance function, as described earlier, can be applied to see if a row is a replay match. Similar to the brute force matching process, the distance function can be applied on the entire entry or on chunks or portions of the entry. Also, filtering can be applied prior to matching to deal with noise. The matching stage 612 may also apply other techniques. For instance various nearest neighbor-matching techniques may be applied. This may include exact or approximate nearest neighbor matching. Techniques such as using Kd-Tree's, k-means clustering, Locality Sensitive Hashing (LSH), etc., may be applied to speed up the matching process.

At the end of the matching process, the new event data, features, and hashes are added to database 613. In this way, newer entries keep getting added and serve as additional data against which a replay check is done for future incoming events. The database 613 could be a relational database or a non-relational database or a database implemented in a custom fashion using custom data structures. The data in the database is stored in a matter to facilitate matcher 612. For exhaustive/brute force matching the data can simply be arranged linearly row by row. In the case of lookups using hashes, indexes are created (corresponding to the hashes). In some embodiments, techniques may include Kd-tree, k-means clustering, Locality-sensitive hashing, or other schemes. The database 613 implements data structures suitable for the technique used. The matching process returns a score/probability of whether the incoming event data is a replay or not. If it is a replay, it is indicative of a bot. Depending on the result, additional checks can be performed.

Figure 6B:
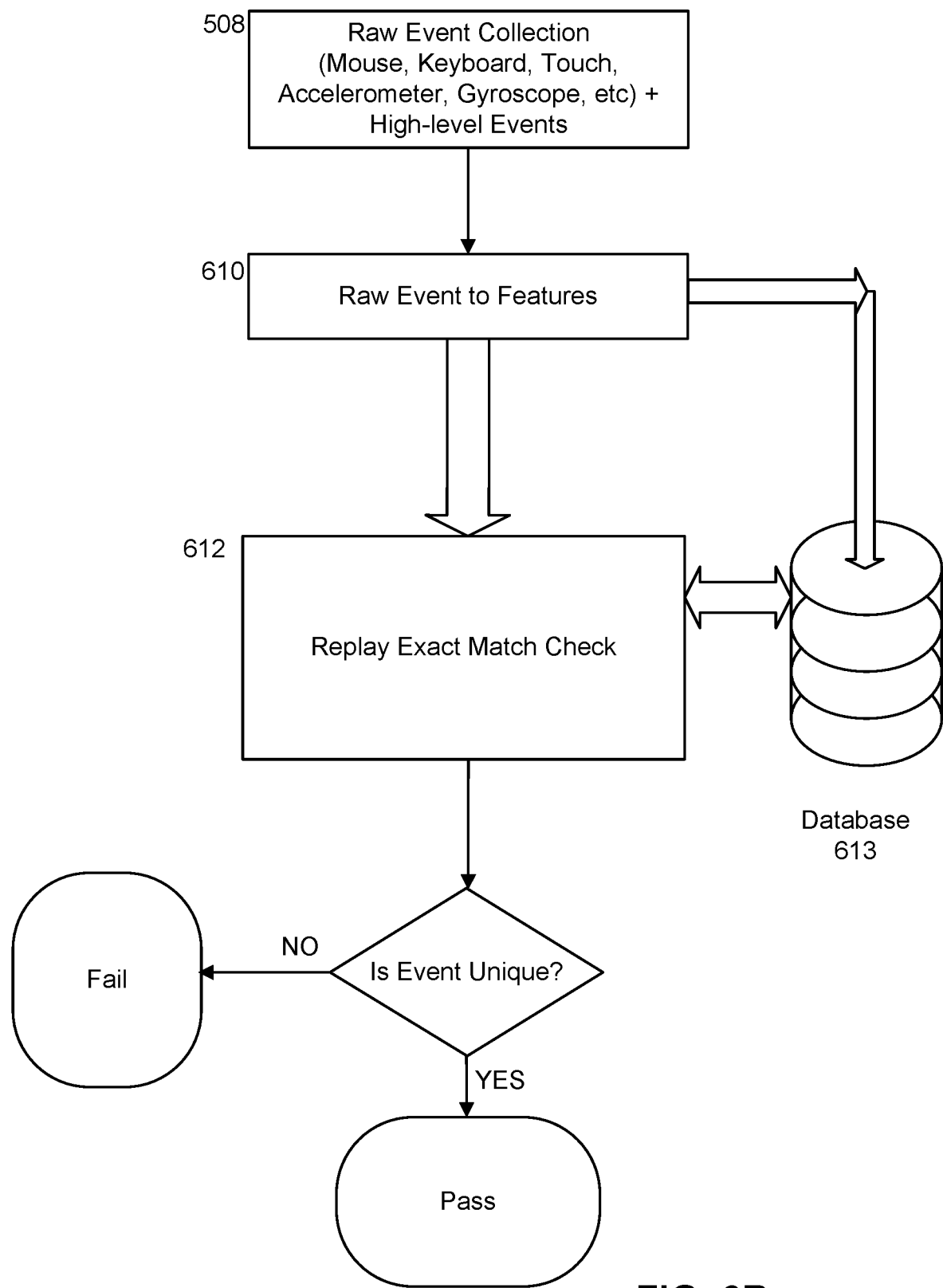

FIG. 6B shows another embodiment of a flow chart for a replay check. In the depicted embodiment, the raw features are collected at stage 508 and converted to features at stage 610. Those features may be stored to a database 613 to generate a more complete data set. The features may also be sent to stage 612 to compare the features against past features stored in the database 613 to determine if an exact match is found which indicates a replay attack has occurred. If the event is determined to be unique, the event passes and the action is completed. If an exact match is found, the event fails and the action is denied or other recourses taken, such as blocking the user, reporting the user, performing further checks, logging or otherwise recording the event, generating an alert, etc.

Figure 6C:
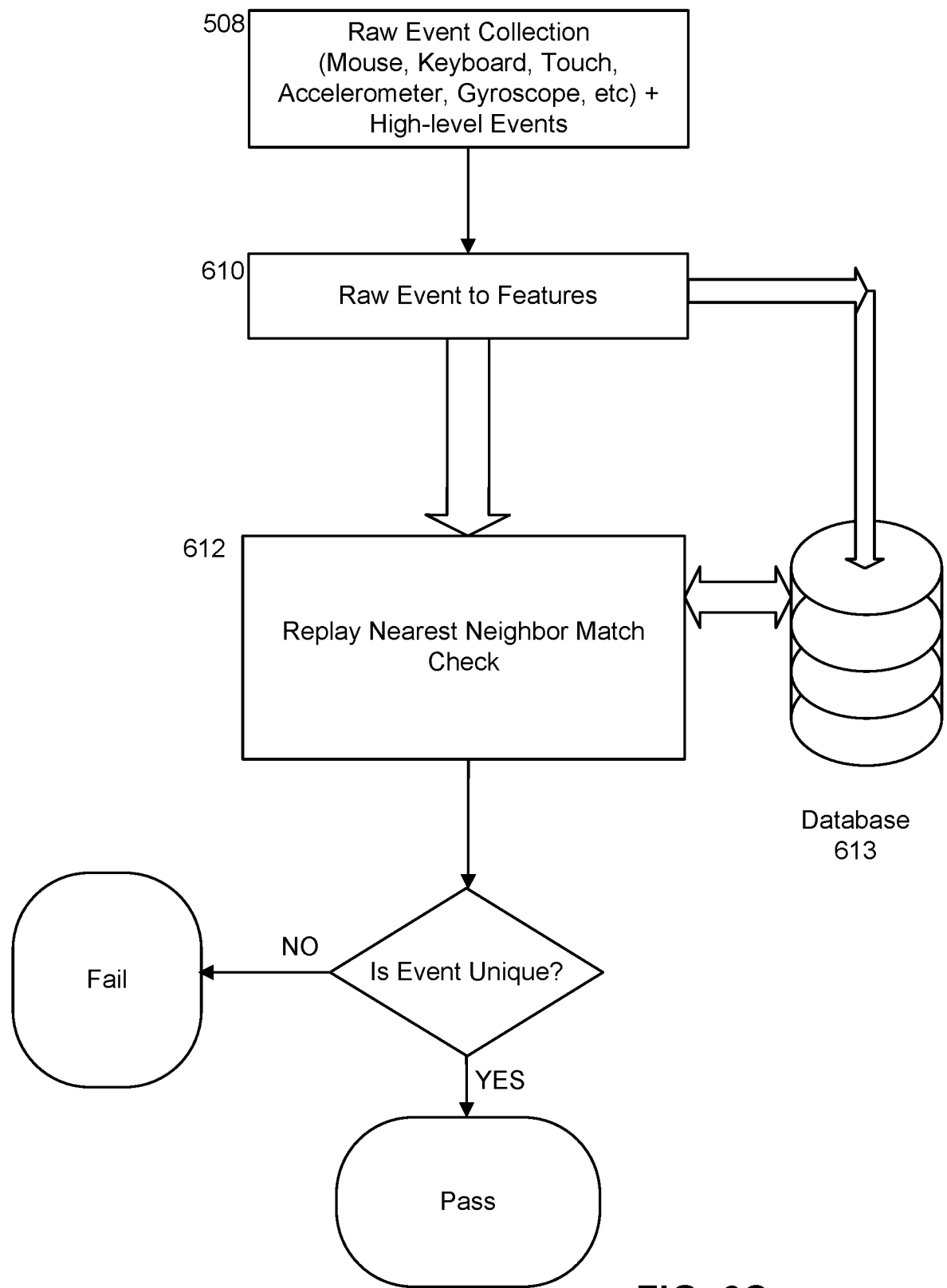

FIG. 6C shows another embodiment of a flow chart for a replay check. In this embodiment, instead of applying an exact match check, the check stage 612 applies a nearest neighbor match check to determine if the features from the event are sufficiently close to stored data in the database 613 to qualify as a match. If the event is not a match, the event passes. If determined to be a constructive match, the event is determined to be an attack and fails. Nearest neighbor matching may employ techniques such as KD-trees, LSH, brute force threshold search, etc.

Figure 6D:
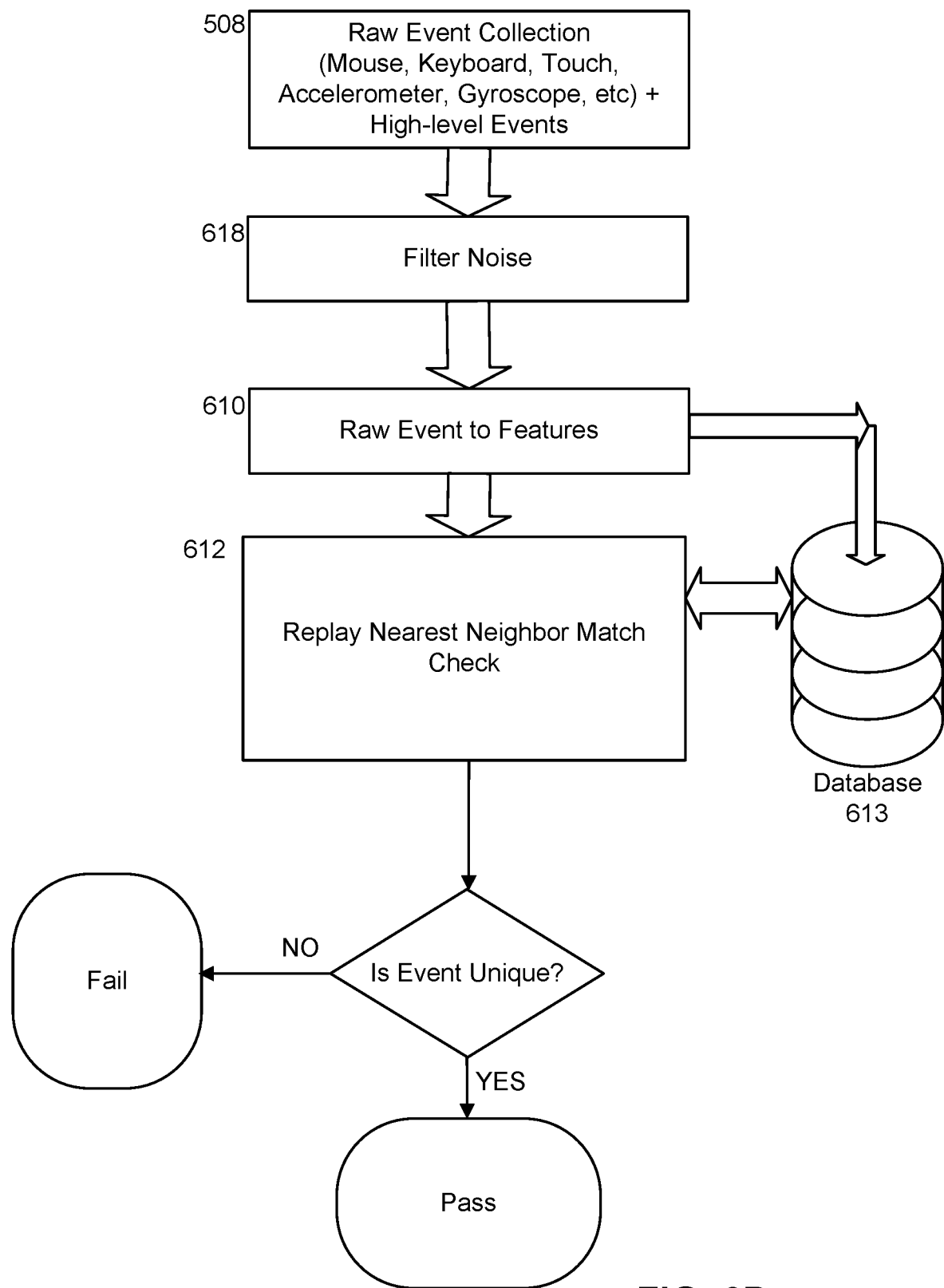

FIG. 6D shows another embodiment of the flow chart of FIG. 6B with an additional noise filtering stage 618 prior to extracting features from the raw data. This may facilitate a more exact matching process. Here, the embodiment includes a nearest neighbor match technique. However, other techniques can also benefit from the use of noise filtering as well.

Figure 7A:
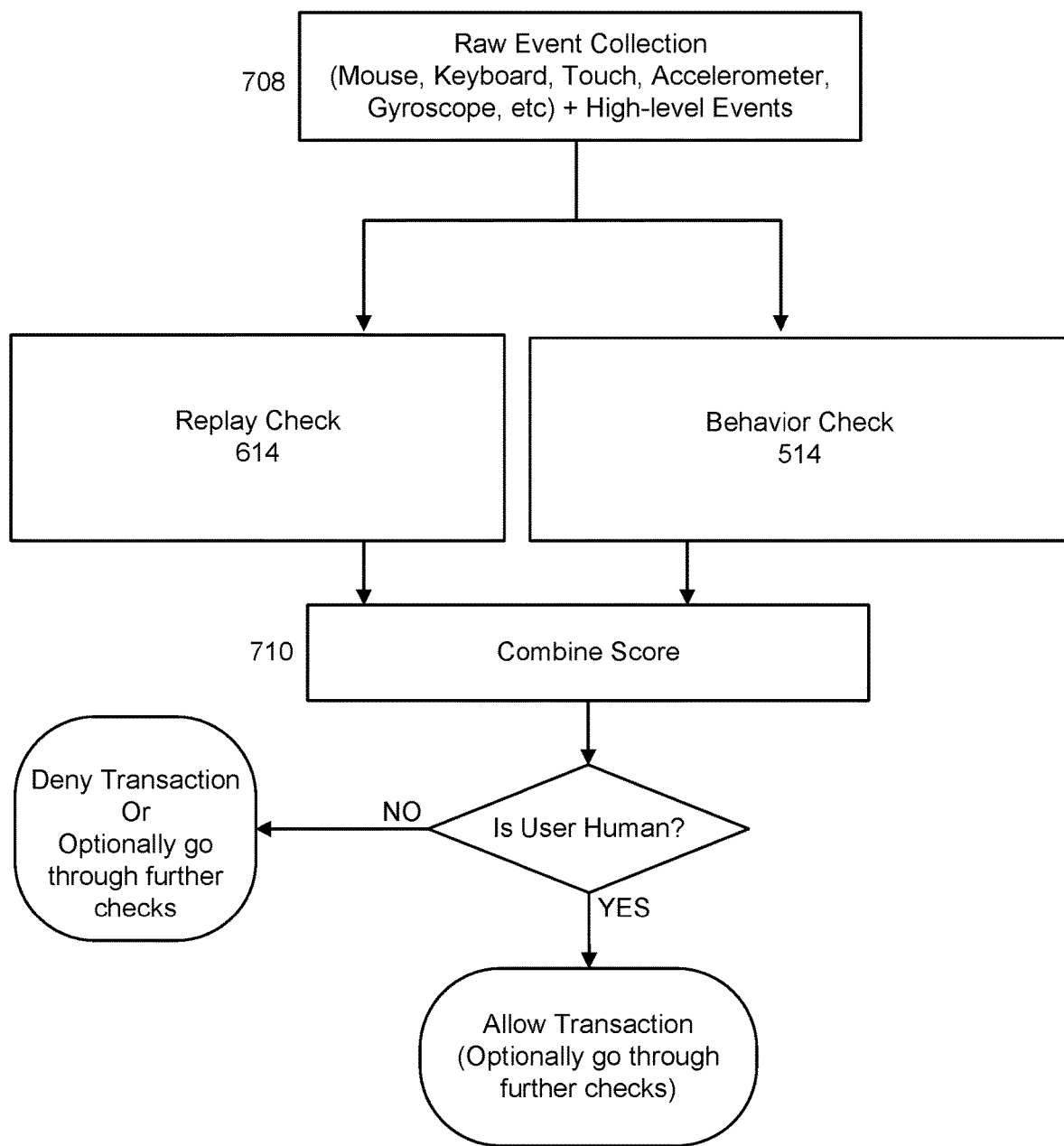
FIGS. 7A-D show embodiments of flow charts for testing events.

FIGS. 7A-D show embodiments of flow charts for testing events. FIG. 7A shows one embodiment of a flow chart for generating a combined score. The embodiment includes Raw Event Collection stage 708 (similar to stage 508 described in FIG. 5). The raw events are sent to the behavior check stage 514 and the replay check stage 614. Both these stages may operate in parallel and produce their own scores. The scores are passed to the combine score stage 710. This stage 710 looks at both the scores to come up with a final score. In one possible embodiment, the combine score stage 710 may check if either stage 514 or stage 614 flags a bot and then use that as an indicator of a bot. In one possible embodiment, combine score stage 710 may use the lowest of the scores produced from stage 514 and 614. In one possible embodiment, combine score stage 710 may use the highest of the scores produced from stage 514 and 614. Various other score combinations are possible. The final score produced is used to determine whether the events generated are from a human user or a bot. Based on the result, additional checks can be applied.

Figure 7B:
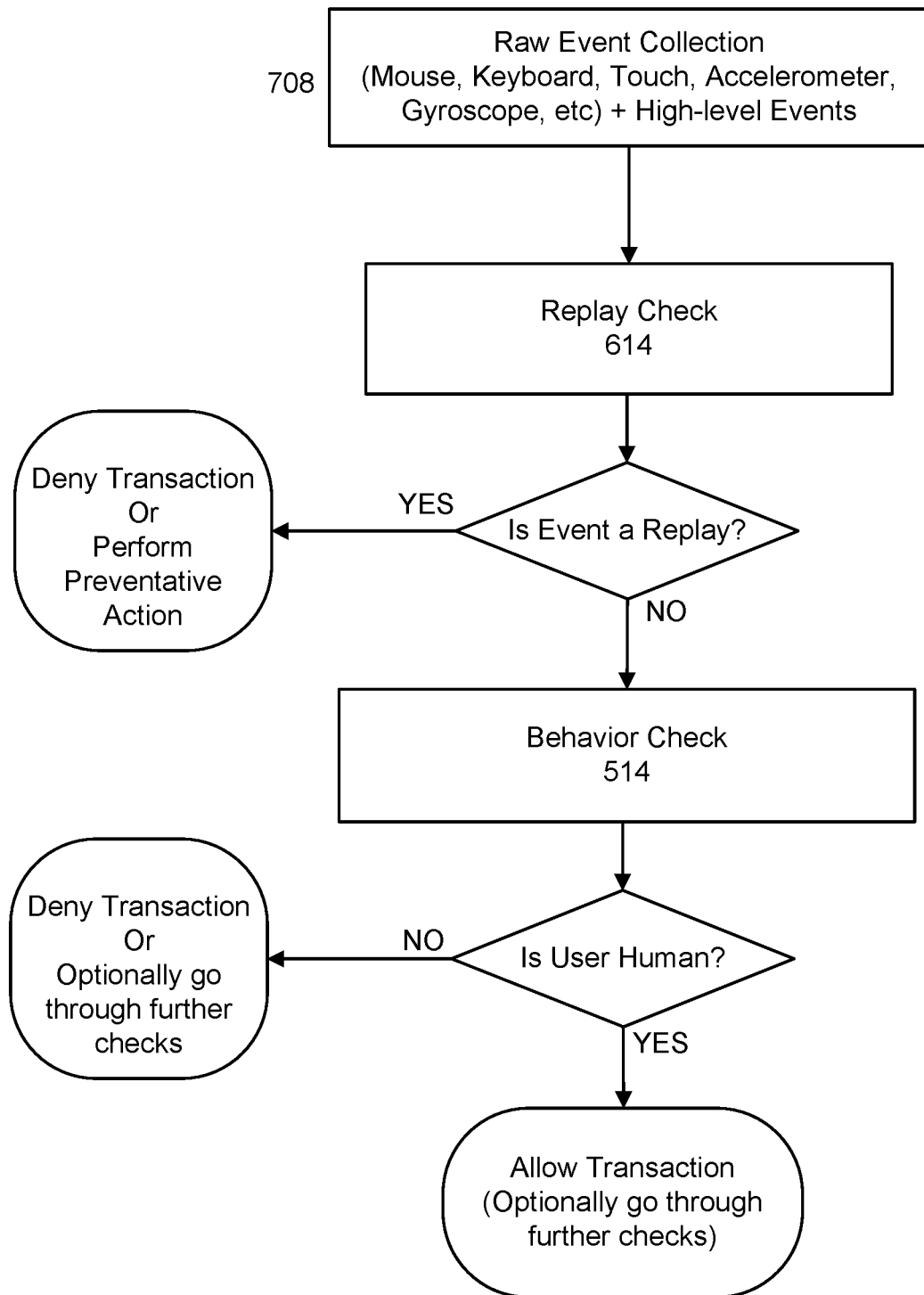

FIG. 7B shows one embodiment of a flow chart for performing the replay check and behavior check sequentially. In this embodiment, the raw event data collection stage 708 may send the event to an initial replay check 614. In some embodiments, the raw data may be sent directly or first analyzed to extract features as described above. In some embodiments, the replay check 614 may be a preliminary replay check that is done at a client device or a server. The replay check 614 may be an exact match check, a nearest neighbor check, or other technique of varying complexity or thoroughness. If the replay check 614 determines that the event is a replay attack, the replay check is failed. In some embodiments, the event may be denied or other action, preventative or otherwise, may be taken. If the event is determined not to be a replay, a behavior check 514 may be run to verify that the event was entered by a human user. Similarly, the outcome of the behavior check 514 may determine whether the event is allowed to occur or some other action taken. In some embodiments, the replay check 614 and the behavior check 514 may occur at the same location. In another embodiment, the replay check 614 and the behavior check 514 may be done at separate times or locations. For example, the replay check 614 or the behavior check 514 may be done at a client device and the other check done at a server end or other location.

Figure 7C:
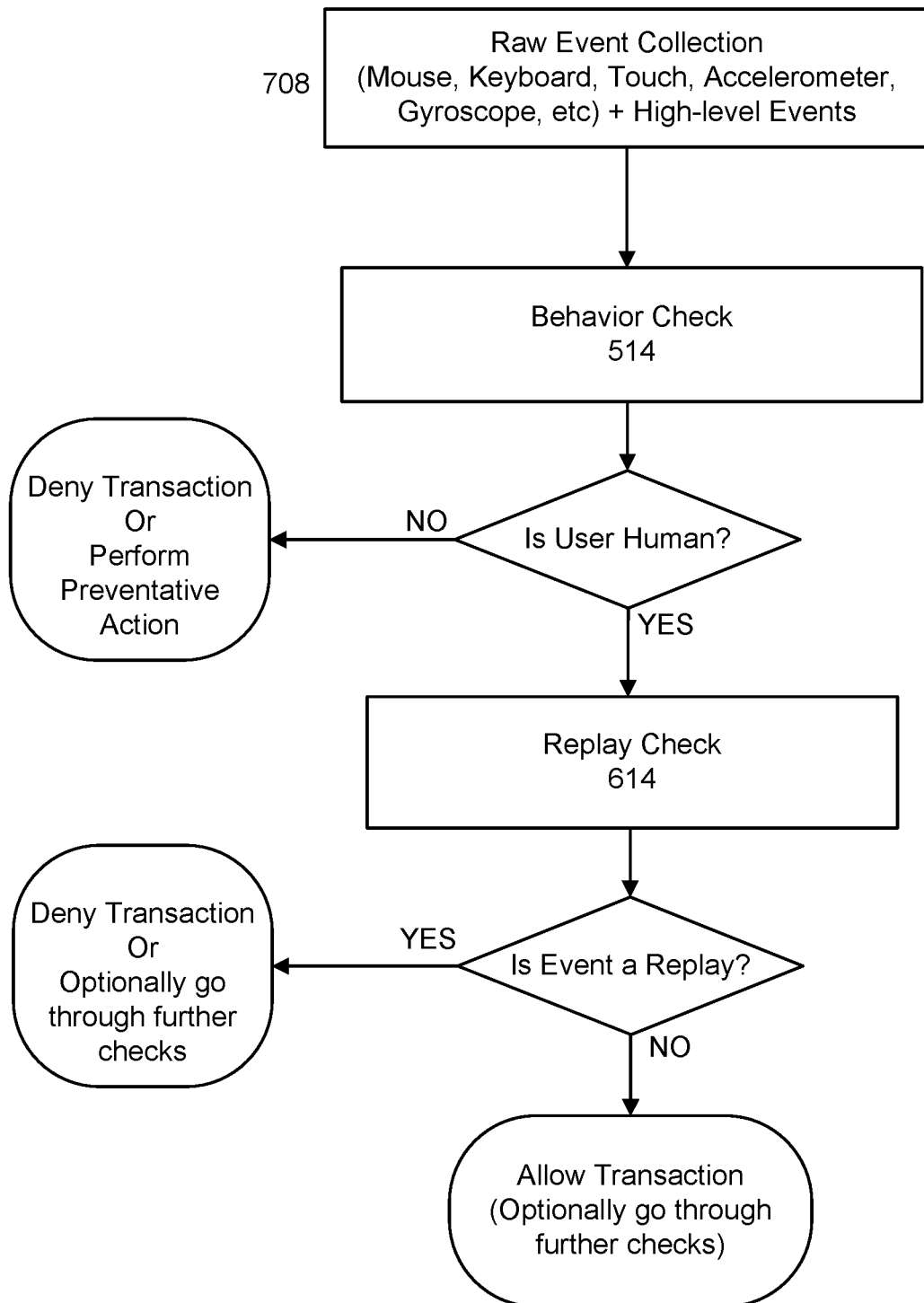

FIG. 7C depicts another embodiment of the flow chart of FIG. 7B with the order of the behavior check 514 and the replay check 614 switched. In this embodiment, the behavior check 514 may first be applied to verify that the event is a human input. Subsequently, the replay check 614 may be completed to verify that, even though the event may be human in origin, the event is not simply a replay attack using recording human event data.

Figure 7D:
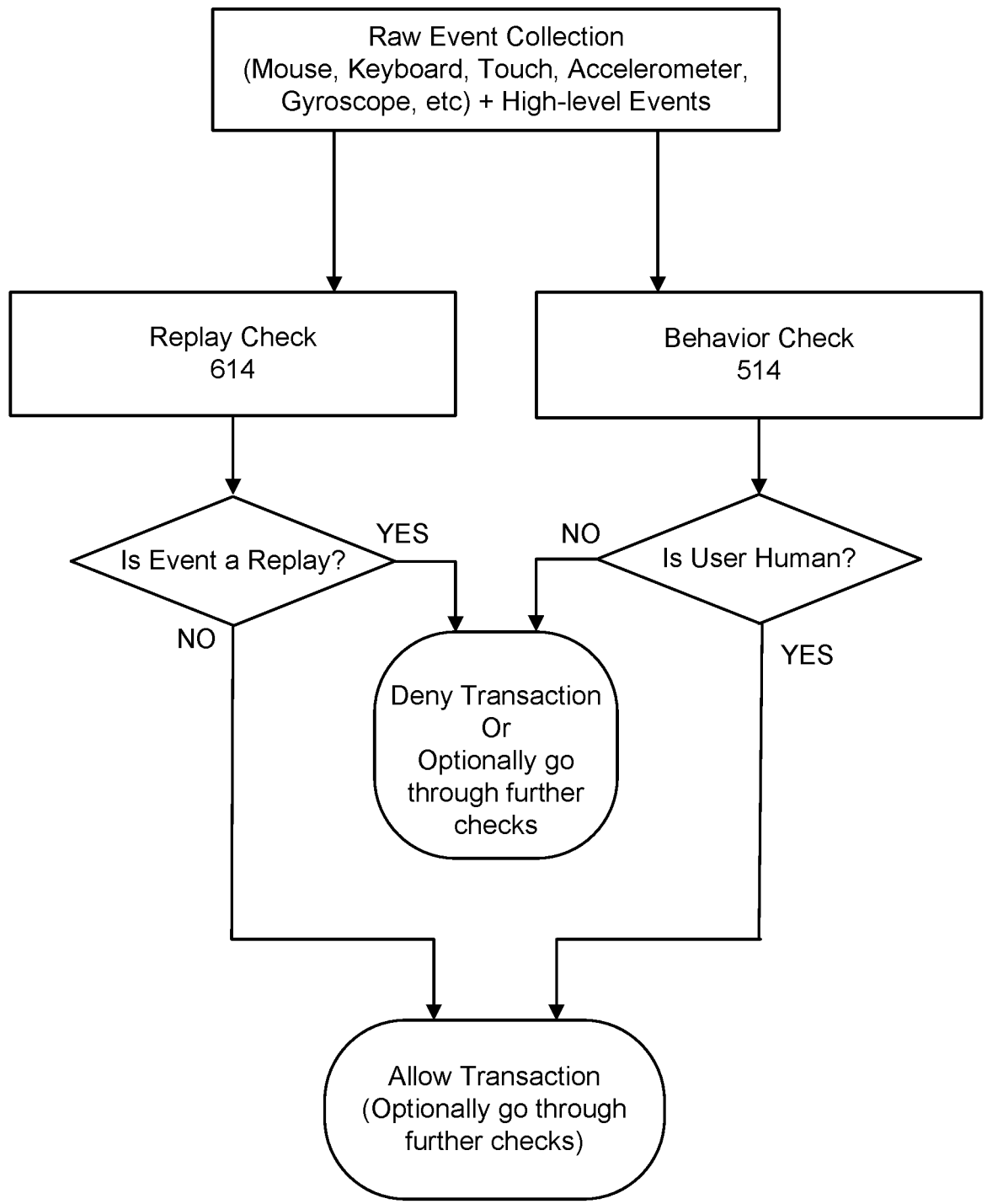

FIG. 7D depicts another embodiment of a flow chart with the replay check 614 and the behavior check 514 run independently. In this embodiment, the check 514 and 614 may be run in parallel or separately. In some embodiments, a certain type of event may be run through the replay check 614 without running the behavior check 514. Alternatively, an event may be verified with the behavior check 514 without the replay check 614. In another embodiment, the replay check 614 and the behavior check 514 may be initiated simultaneously but a failure at either the behavior check 514 or the reply check 614 may abort the other check prior to completion and fail the event. Similarly, a pass from either check may abort the other check prior to completion and pass the event.

Figure 8:
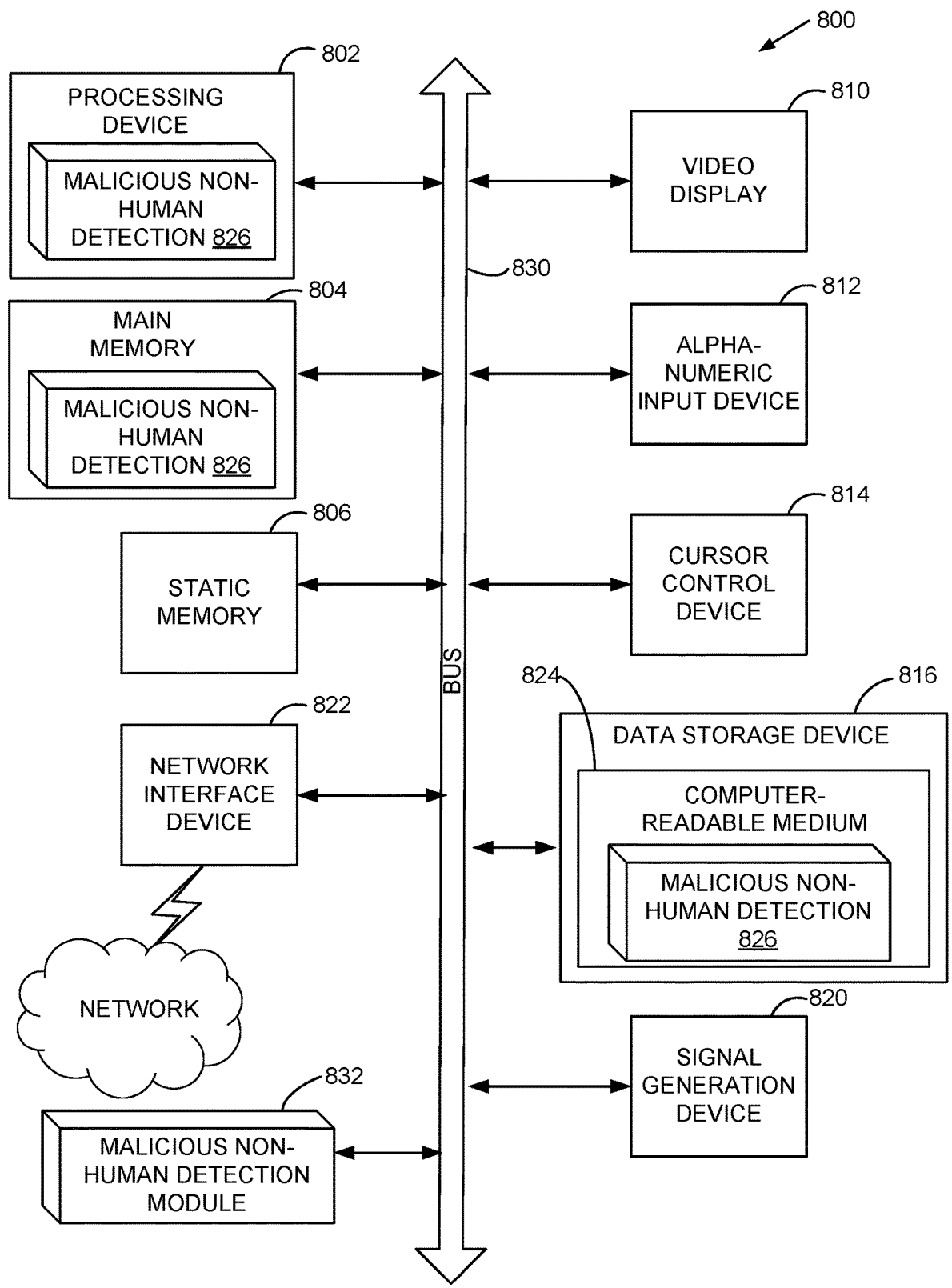
FIG. 8 illustrates a diagrammatic representation of one embodiment of a machine in the exemplary form of a computing system for malicious non-human user detection.

FIG. 8 illustrates a diagrammatic representation of one embodiment of a machine in the exemplary form of a computing system 800 for malicious non-human user detection. Within the computing system 800 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for malicious non-human user detection, such as the methods described above. The computing system 800 represents various components that may be implemented in the devices described herein.

The exemplary computing system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, each of which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic (e.g., malicious non-human user detection 826) for performing the operations and steps discussed herein.

The computing system 800 may further include a network interface device 822. The computing system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-readable storage medium 824 on which is stored one or more sets of instructions (e.g., malicious non-human user detection 826) embodying any one or more of the methodologies or functions described herein. The malicious non-human user detection 826 may also reside, completely or at least partially, within the main memory 804 and/or within the processing device 802 during execution thereof by the computing system 800, the main memory 804 and the processing device 802 also constituting computer-readable storage media. The malicious non-human user detection 826 may further be transmitted or received over a network via the network interface device 822.

While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The malicious non-human user detection module 832, components, and other features described herein (for example in relation to FIGS. 1-7) can be implemented as discrete hardware components or integrated in the functionality of hardware components such as ASICS, FPGAs, DSPs, or similar devices. The malicious non-human user detection module 832 may implement operations of malicious non-human user detection as described herein with respect to FIGS. 1-7. In addition, the malicious non-human user detection module 832 can be implemented as firmware or functional circuitry within hardware devices. Further, the malicious non-human user detection module 832 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method of improving a processing device having a client component and a server component, comprising:
   collecting, by the client component, data corresponding to an action occurring at the processing device;

converting, by the client component, the data to one or more features, wherein the one or more features represent characteristics of a human user or a bot;

comparing, by the client component, at least one of the features against a learned model to determine, in a replay check, whether the at least one feature is indicative of a replay by the bot; and upon a determination that the at least one feature is not indicative of a replay by the bot, further processing the one or more features by the server component against the learned model in a behavior check to determine whether the one or more features represent a behavior of the human user.

2. The method of claim 1, further comprising processing the data to reduce an effect of noise, perturbation, or randomization.

3. The method of claim 1, wherein the replay check comprises performing at least one of an exact match or a nearest neighbor match.

4. The method of claim 1, further comprising hashing the data to perform the replay check.

5. The method of claim 1, wherein collecting the data corresponding to the action further comprises receiving the data from an input device.

6. The method of claim 1, further comprising rejecting the action in response to a detection that the action is from the bot and not the human user.

7. A non-transitory computer readable storage medium comprising instructions that, when executed by a processing device having a client component and a server component, cause the processing device to perform operations, comprising:

collecting, by the client component, data corresponding to an action occurring at the processing device;

converting, by the client component, the data to one or more features, wherein the one or more features represent characteristics of a human user or a bot;

comparing, by the client component, at least one of the features against a learned model to determine, in a replay check, whether the at least one feature is indicative of a replay by the bot; and upon a determination that the at least one feature is not indicative of a replay by the malicious code, further processing the features by the server component against the learned model in a behavior check to determine whether the features represent a behavior of the human user.

8. The non-transitory computer readable storage medium comprising instructions of claim 7, wherein the operations further comprise processing the data to reduce an effect of noise, perturbation, or randomization.

9. The non-transitory computer readable storage medium comprising instructions of claim 8, wherein the replay check comprises performing at least one of an exact match check or a nearest neighbor match.

10. The non-transitory computer readable storage medium comprising instructions of claim 7, wherein the operations further comprise hashing the data to perform the replay check.

11. The non-transitory computer readable storage medium comprising instructions of claim 7, wherein collecting the data corresponding to the action further comprises receiving the data from an input device.

12. The non-transitory computer readable storage medium comprising instructions of claim 7, wherein the operations further comprise rejecting the action in response to a detection that the action is from the bot and not the human user.

13. A computing system, comprising:

a data storage device; and a processing device having a client component and a server component, coupled to the data storage device, to:

collect, by the client component, data corresponding to an action occurring at the processing device;

convert, by the client component, the data to one or more features, wherein the one or more features represent characteristics of a human user or a bot;

compare, by the client component, at least one of the features against a learned model to determine, in a replay check, whether the at least one feature is indicative of a replay by the bot; and upon a determination that the at least one feature is not indicative of a replay by the bot, further process the features by the server component against the learned model in a behavior check to determine whether the features represent a behavior of the human user.

14. The system of claim 13, wherein the processing device is further configured to process the data to reduce an effect of noise, perturbation, or randomization of the at least one of the features against the learned model.

15. The system of claim 13, wherein the replay check comprises performing at least one of an exact match check or a nearest neighbor match.

16. The system of claim 13, wherein the processing device is further configured to receive the data from an input device.

17. The system of claim 13, wherein the processing device is further operative to reject the action in response to a detection that the action is from the bot and not the human user.

* * * * *